US010628561B2

(12) United States Patent
Gabler et al.

(10) Patent No.: US 10,628,561 B2
(45) Date of Patent: *Apr. 21, 2020

(54) TECHNIQUE FOR ENABLING NOMINAL FLOW OF AN EXECUTABLE FILE

(71) Applicant: Denuvo GmbH, Salzburg (AT)

(72) Inventors: Christopher Gabler, Salzburg (AT); Robert Yates, Oberalm (AT); Leo Rauch, Salzburg (AT); Matthias Moninger, Salzburg (AT)

(73) Assignee: DENUVO GMBH, Salzburg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,963

(22) Filed: Oct. 1, 2018

(65) Prior Publication Data

US 2019/0042709 A1    Feb. 7, 2019

Related U.S. Application Data

(63) Continuation of application No. 14/839,254, filed on Aug. 28, 2015, now Pat. No. 10,114,933.

(30) Foreign Application Priority Data

Sep. 22, 2014    (EP) .................................... 14003279

(51) Int. Cl.
*G06F 21/12* (2013.01)
*G06F 21/62* (2013.01)
*H04L 29/08* (2006.01)

(52) U.S. Cl.
CPC .......... *G06F 21/123* (2013.01); *G06F 21/125* (2013.01); *G06F 21/6209* (2013.01); *H04L 67/06* (2013.01); *G06F 2221/0773* (2013.01)

(58) Field of Classification Search
CPC .. G06F 21/123; G06F 21/6209; G06F 21/125; G06F 2221/0773; H04L 67/06
See application file for complete search history.

(56) References Cited

U.S. PATENT DOCUMENTS 6,334,189 B1 * 12/2001 Granger ................ G06F 21/123
380/255
6,792,113 B1 * 9/2004 Ansell ..................... G06F 21/10
380/284

(Continued)

*Primary Examiner* — Khoi V Le
(74) *Attorney, Agent, or Firm* — Rimon PC; Marc Kaufman

(57) ABSTRACT

A technique for enabling nominal flow of an executable file on a client is described. The executable file comprises executable code lacking at least one nominal constant, wherein only the nominal constant enables the nominal flow of the executable file and wherein a server has access to the at least one nominal constant. In a method aspect performed by the client, the method comprises retrieving hardware information of the client, wherein the hardware information is at least substantially unique. The method further comprises transmitting one of the hardware information and information derived therefrom to a server and, in turn, receiving at least one constant that has been transformed based on one of the hardware information and the information derived therefrom. The client then performs, using one of the hardware information and the information derived therefrom, an inverse transformation on the at least one transformed constant to recover the nominal constant. A server-side method aspect comprises receiving, from the client, one of the substantially unique hardware information and the information derived therefrom, transforming the at least one nominal constant using one of the hardware information and the information derived therefrom, and transmitting, to the client, the at least one transformed constant.

17 Claims, 5 Drawing Sheets

(56) References Cited

U.S. PATENT DOCUMENTS 9,212,041 B2 * 12/2015 Keating .............. B67D 3/0041
2014/0263418 A1 * 9/2014 Keating .............. B67D 3/0041
222/1

* cited by examiner

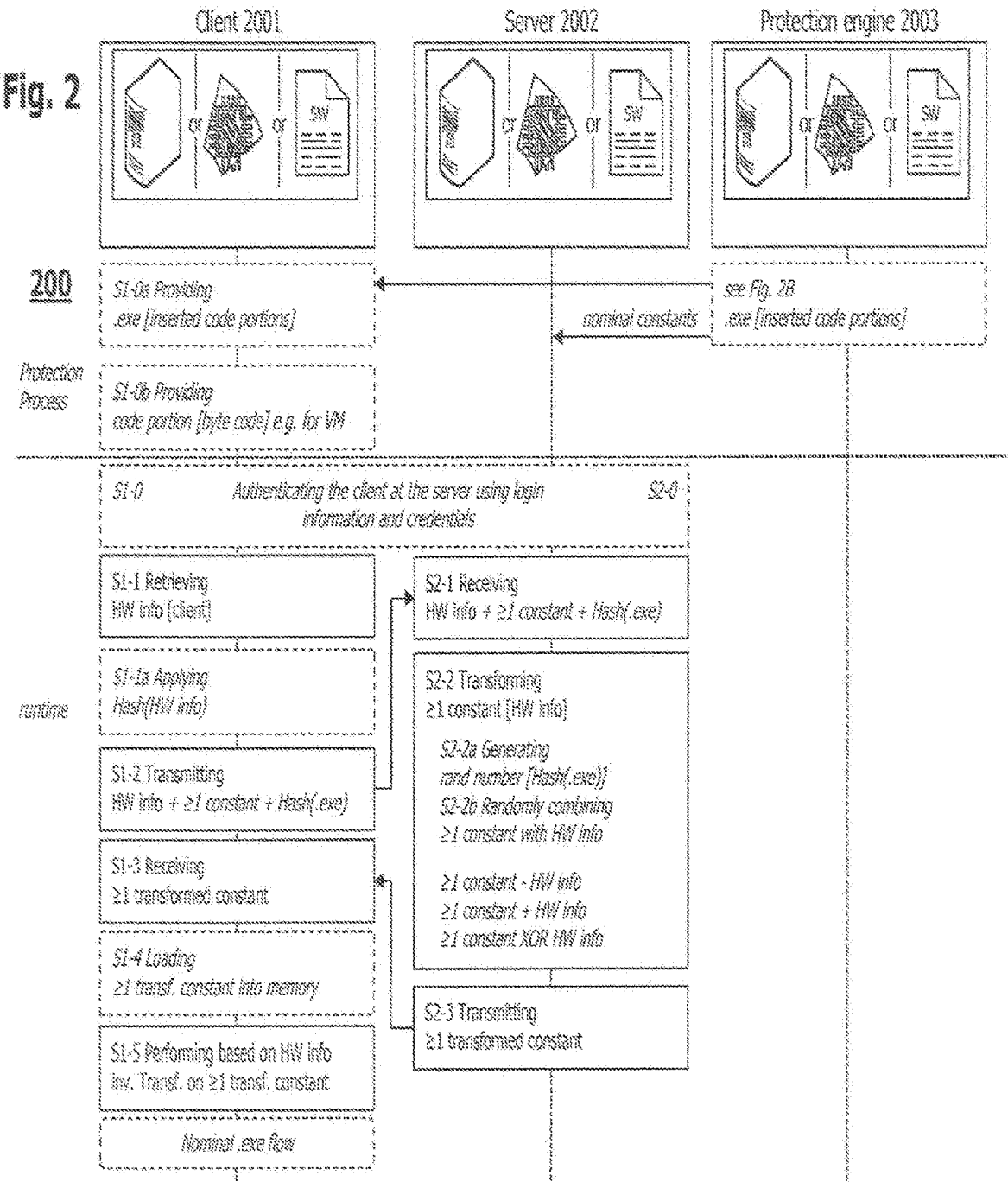

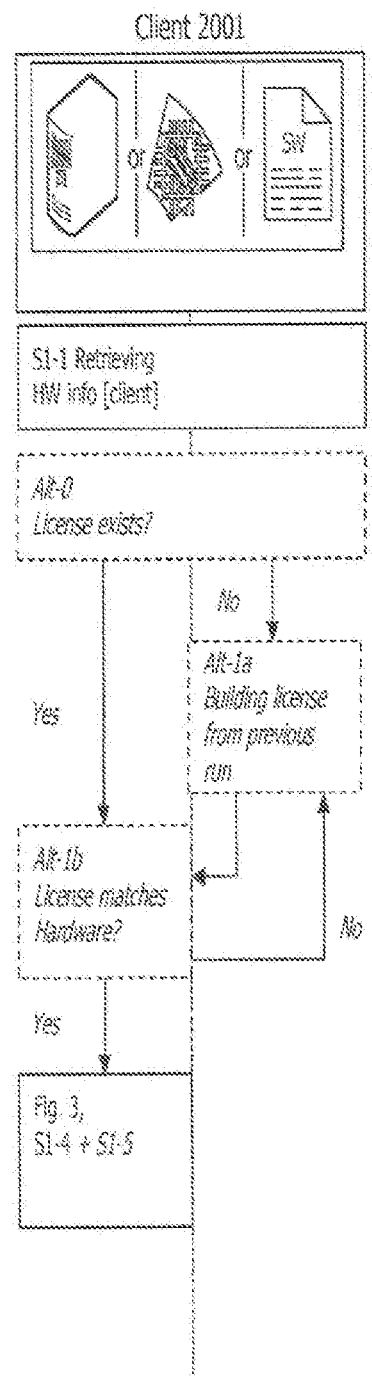

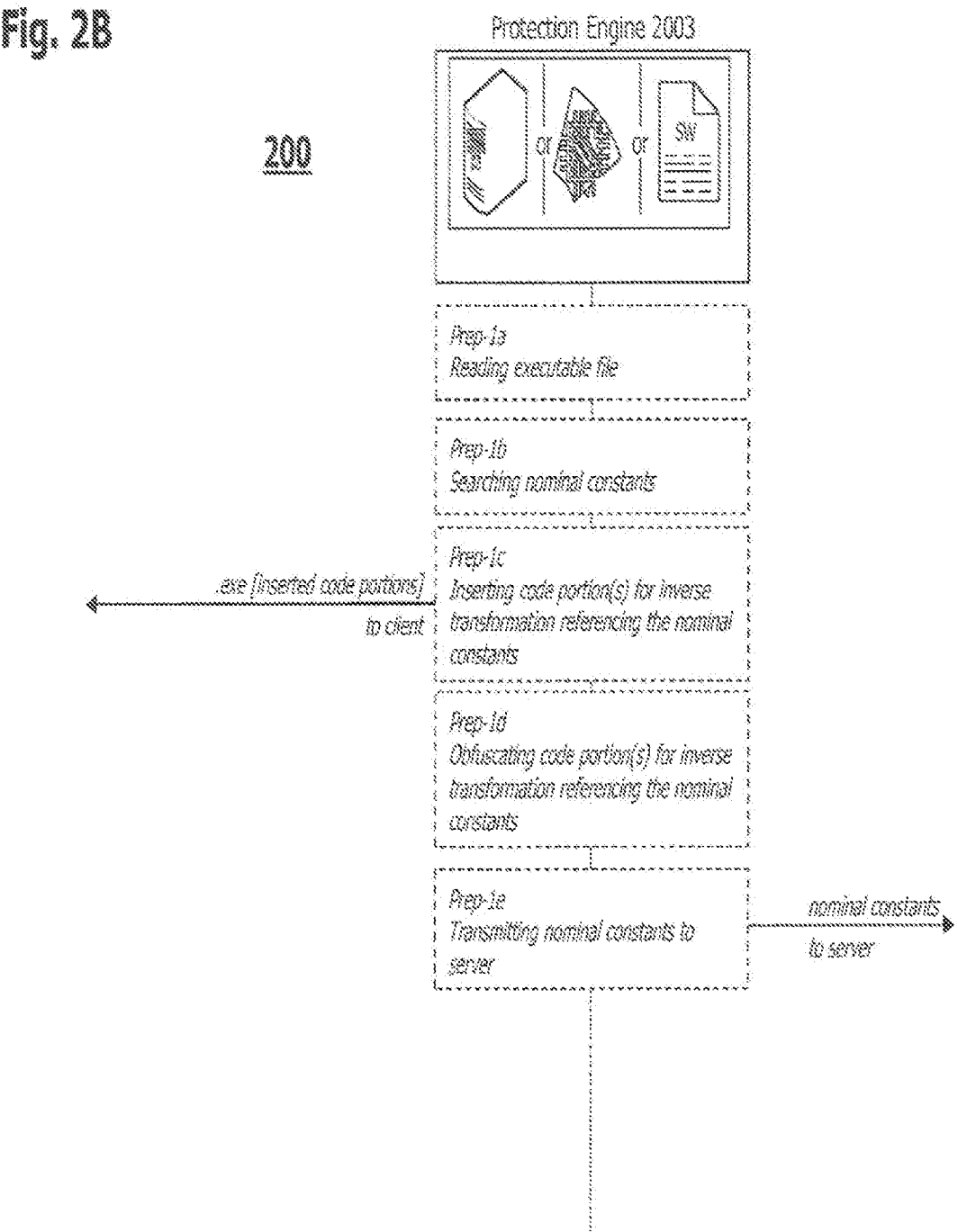

TECHNIQUE FOR ENABLING NOMINAL FLOW OF AN EXECUTABLE FILE

CROSS REFERENCE TO RELATED APPLICATIONS

The present application is the continuation application of U.S. non provisional application Ser. No. 14/839,254 filed on Aug. 28, 2015, and titled TECHNIQUE FOR ENABLING NOMINAL FLOW OF AN EXECUTABLE FILE, which claims priority to the benefit European patent application EP 14003279.8, entitled "TECHNIQUE FOR ENABLING NOMINAL FLOW OF AN EXECUTABLE FILE" and filed on Sep. 22, 2014, the entire content of which is both being incorporated herein in its their entirety.

TECHNICAL FIELD

The present disclosure generally relates to enabling nominal flow of an executable file. The disclosure may be practiced in connection with digital rights management systems, for example for protecting an executable file from being copied without proper authorization. The technique of the present disclosure may be embodied in methods, computer programs and/or apparatuses.

BACKGROUND

Current prior art copy protection systems often check hardware components of a computer on which an executable file is to be executed to identify whether the executable file has actually been activated for that computer. During an exemplary activation process, hardware information of the computer for which the executable file is to be activated (also called client in the present context) is sent to an activation server. The activation server returns to the client a license that embeds the hardware information in any form (e.g., encrypted).

The license can be validated, for example upon start of the executable file, and hardware information of the currently used client is compared to the information stored in the license file. The hardware information check has usually a true/false condition, and if the hardware information does not match, a new activation of the executable file for the particular client is required.

As an example of a prior art protection system, the following syntax may be used to attain a hardware binding implementation:
1) if(!isHardwareBindingValid ( ))
2) condition (eg. TerminateProcess)

That is, the prior art suggests an approach in which a comparison of the hardware information of the currently used client and the information stored in a license file or something similar is performed. However, this check might be circumvented by tampering with hardware verification code, e.g., using so-called "patching".

Still further, a hardware binding may bind software to a specific client using a specific license. Usually, an activation server may provide such a license to the software end-user. A component called Digital Rights Management (DRM) ensures that the activation server only provides licenses to end-users who have paid for the software. This component could also be called authorization component.

One possible DRM implementation would be that the end-user has to enter, e.g., a serial number that he or she received upon payment in order to be able to activate the software. Another possibility is an account that the end-user has used to pay for the software.

SUMMARY

There is a need for an efficient implementation to protect un-authorized use of an executable file.

In a first aspect, there is provided a method for enabling nominal flow of an executable file on a client, wherein the executable file comprises executable code lacking at least one nominal constant, and wherein only the nominal constant enables the nominal flow of the executable file. The method is performed by the client and comprises retrieving substantially unique hardware information of the client, transmitting one of the hardware information and information derived therefrom to a server, receiving at least one transformed constant that has been transformed based on one of the hardware information and the information derived therefrom, and performing, using one of the hardware information and the information derived therefrom, an inverse transformation on the at least one transformed constant to recover the nominal constant.

In a second aspect, there is provided a method for enabling nominal flow of an executable file on a client, wherein the executable file comprises executable code lacking at least one nominal constant, wherein only the nominal constant enables the nominal flow of the executable file and wherein a server contains or has access to the at least one nominal constant. The method is performed by the server and comprising receiving, from the client, one of substantially unique hardware information of the client and information derived therefrom, transforming the at least one nominal constant using one of the hardware information and the information derived therefrom, and transmitting, to the client, the at least one transformed constant.

The executable code may lack the at least one nominal constant in the sense that the code does not include any information about the nominal value of that constant. The code may still allocate memory for that constant and optionally fill that memory with a non-nominal (e.g., dummy) value.

The hardware information can be, but need not be globally unique. As an example, it can also be locally unique (e.g., within a specific geographic area). Alternatively, or additionally, there is just a very low possibility that two clients will yield or be associated with identical hardware information (of, for example, 1 percent or less).

In one scenario, if the hardware information of a client machine currently used to run the executable file is different from the client machine used during activation, the inverse transformation will cause wrong results (i.e., a wrong constant), and therefore the software logic of the executable file will cause undefined behavior. Such undefined behavior may correspond to a non-nominal flow of the executable file.

In the transmitting step of the client, in addition to the hardware information or the information derived therefrom, at least one (e.g., non-nominal) constant (that, e.g., still is to be transformed) may be transmitted. The constant that is transmitted may be extracted from the executable file or may have been received by the client together with or separate from the executable file. In turn, in the receiving step of the server, the substantially unique hardware information, or the information derived therefrom, and at least one constant to be transformed may be received.

The method may further comprise, for example as a preparatory step, providing the client with the executable file in which the at least one nominal constant has been obfuscated. The client will thus receive the executable file (e.g., via a download or via a data carrier such as a CD-ROM) in an obfuscated format. In the executable file the nominal constant may be obfuscated by an inserted code portion for the inverse transformation. In that case, the code portion may be provided in a byte code format interpretable during runtime of the executable file. In that way, traceability of the present technique may in one variant lowered to at least increase the burden for an attacker to identify changes made in the executable file.

The client method may further comprise applying, prior to the transmitting, a hashing function to the (substantially unique) hardware information. The resulting hash value may be transmitted to the server as the information derived from the hardware information. In turn, in the server method, the transforming step may be performed using the hash value of that hardware information, wherein the hash value represents the information derived from the hardware information. This measure may in one example serve for decreasing the amount of data to be transmitted from the client to server (e.g., to lessen the burden on network traffic as the hash value has far less bytes than the hardware information). Alternatively, or additionally, in such a way confidentiality of the hardware information may be achieved, which is now not transmitted in cleartext.

In a refinement, in the transmitting step of the client method a hash value of the executable file may be transmitted to the server. In turn, the transforming step of the server method may further comprise randomly combining, using a random number, the at least one nominal constant with one of the hardware information and the information derived therefrom. In that case, the server method may further comprise generating, prior to the randomly combining step, the random number using a hash value of the executable file as a seed. In that way, an additional random element can be introduced which allows encrypting the transformation/inverse transformation relationship.

In a further refinement, one or more of the at least one transformed constant, the hardware information and the information derived therefrom may be expressed as a numerical value, respectively. Generally, the (inverse) transformation may be regarded as a (de-)encryption process. As an example, the (inverse) transformation may comprise at least one of one or more reversible arithmetic operations on the transformed (nominal) constant and one of the hardware information and the information derived therefrom, and one or more reversible logical operations on the transformed (nominal) constant and one of the hardware information and the information derived therefrom. In this way, the proposed approach enables obfuscation (or encryption) of the nominal value using, for example, simple and reversible standard functions/operators.

Still further, the client-side method may comprise building a license file. In one exemplary variant, the license file may be built based on the transformed constants obtained from the transmitting and receiving steps. The method may further comprise determining whether the license matches one of the hardware information and the information derived therefrom. If the determining step is affirmative, only the step of performing the inverse transformation is performed based on the one or more transformed constants from the license file. This measure serves for enabling nominal flow also in case the dent is offline or has otherwise no contact to the server.

Optionally, the method may further comprise loading, prior the performing, the transformed constants or the nominal constants (i.e., their nominal values) into a memory of the server.

Further optionally, the client-side method and the server-side method may comprise authenticating, for example prior to the client retrieving step and the server receiving step, the dent at the server (e.g., using login information and credentials). This measure can serve for combining the advantages of the proposed technique and of DRM. This approach may ascertain that only users (clients) having validly purchased the executable file are provided with the transformed constants.

The at least one nominal constant may be a numerical value used in the executable code, which number remains unchanged during the entire runtime of the executable file. In that case, the at least one nominal constant may be at least one of a constant not used for pointer operations or referencing operation, and a floating point number constant. Also this measure can serve for avoiding traceability of the proposed approach, since the software (executable file) is less likely to crash or is at least likely to cause a crash at a later point of the execution flow.

The substantially unique hardware information may comprise one or more of the following elements: a Media Access Control, MAC, address of the client, an identity of one or more constituent hardware components of the client (which need not necessarily be unique each but possibly in their combination), an international Mobile Subscriber Identity, IMSI of the client, and an International Mobile Station Equipment Identity, IMEI, of the client. Generally, the hardware information can comprise information readily available on the client. As said, "substantially unique" does not necessarily imply global uniqueness as for example the IMEI does; for instance, the hardware information may comprise several IDs of hardware components (such as processors graphic cards, sound cards etc.) of the client, which combination of IDs is at least unlikely to occur a second time in a given set of clients.

In a further aspect, there is provided a computer program product comprising program code portions for performing the method of the first aspect when the computer program product is executed on one or more computing devices, such as clients and servers. The computer program product may be stored on a computer readable recording medium.

Still further, it is to be noted that the method aspects may also be embodied on an apparatus according to fourth and fifth aspects, respectively, comprising at least one processor and a suitable local or remote memory (e.g., a semiconductor component or cloud storage) for carrying out any one of the method steps.

BRIEF DESCRIPTION OF THE DRAWINGS

Exemplary embodiments of the technique presented herein are described herein below with reference to the accompanying drawings, in which:

FIG. 2 shows a method embodiment which also reflects the interaction between the components of the apparatus embodiment;

FIG. 2A shows a first optional method embodiment to be used with the embodiment shown in FIG. 2;

FIG. 2B shows a second optional preparatory method embodiment to be used with the embodiment shown in FIG. 2.

DETAILED DESCRIPTION

Figure 1:
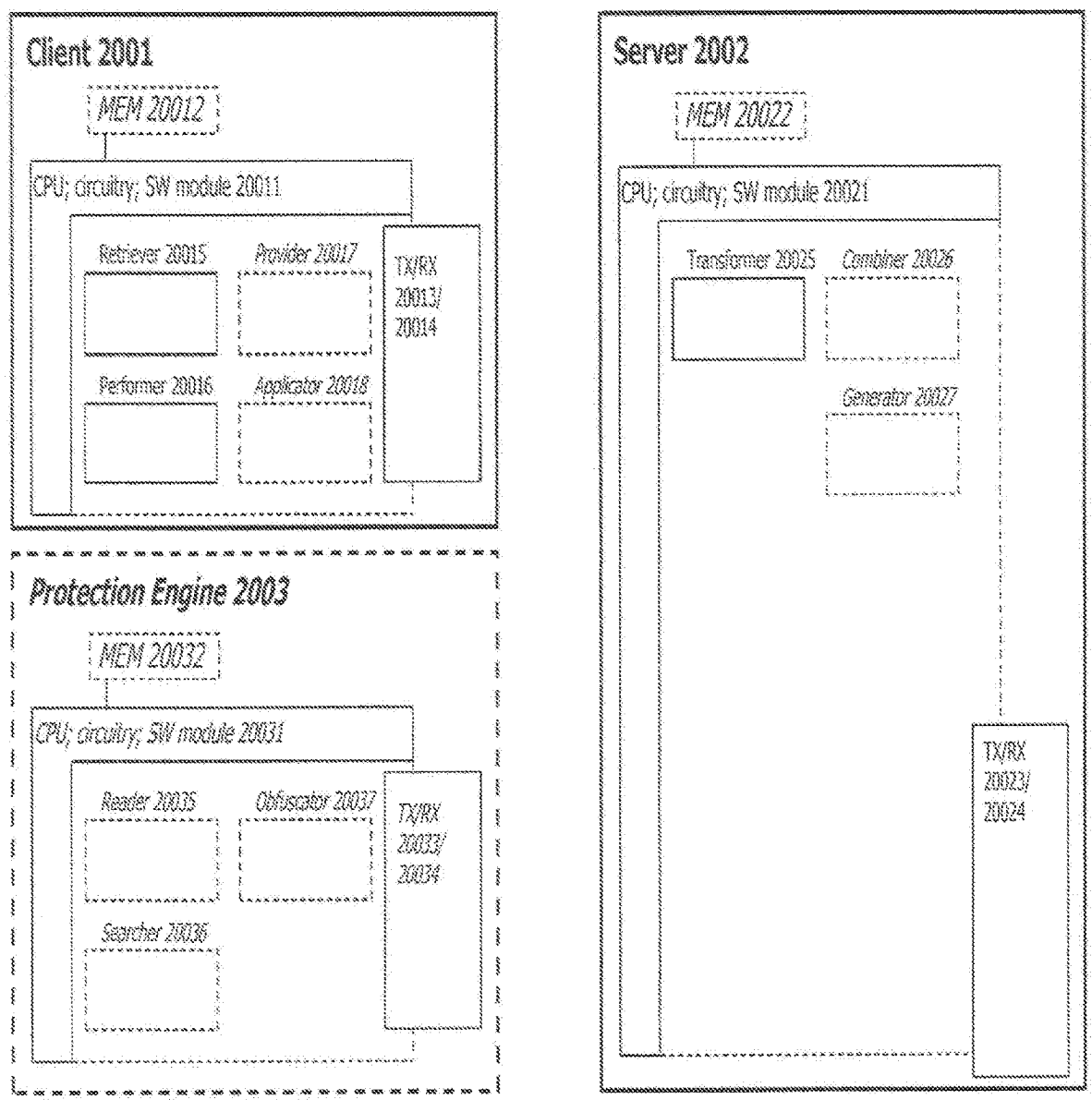
FIG. 1 shows components comprised in an exemplary device embodiment realized in the form of apparatus (which may reside, e.g., in a client, a server and an optional protection engine)

In the following description, for purposes of explanation and not limitation, specific details are set forth (such as particular signalling steps and client/server configurations) in order to provide a thorough understanding of the technique presented herein. It will be apparent to one skilled in the art that the present technique may be practiced in other embodiments that depart from these specific details. For example, the embodiments will primarily be described in the context of licensing and DRM techniques; however, this does not rule out the use of the present technique in connection with (future) technologies consistent with licensing and DRM. Moreover, while certain embodiments will be described with reference to an assembly language, this does not rule out that the technique presented herein can also be practiced in connection with a higher-level programming language.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Without loss of generality, the proposed solution in the present, exemplary embodiments consists of two parts and requires a serer to function in a secure way. The solution binds constants of the executable code to the hardware information of a machine, on which the software represented by the executable file is or was activated. Constants may be numbers used in executable code for calculation purposes, which are not changing during the entire runtime. An example for a constant would be PI (3.14159255359), which could be used inside an algorithm to calculate the volume of a cylinder.

The binding of constants may be done during a protection process of the executable file. Constants or placeholders therefor may be searched inside the executable file and modified to not match the original constants anymore, replaced by variants, or obfuscated otherwise. Code portions may then be inserted in the code of the executable file (e.g., right before each constant is used in the executable flow) to transform the constant back to the original value, insert the constant or de-obfuscate otherwise. The de-obfuscation is dependent on specific hardware information of the machine, and therefore different hardware in the machine currently used than the machine used during the activation process will result in a wrong inversely transformed constant. The result will be a non-nominal flow of the executable file (e.g., in terms in wrong calculation results and, based thereon, wrong display or play-out behavior).

FIG. 2 shows components comprised in an exemplar system embodiment realized to comprise a client (or client machine) 2001, a server 2002 and an optional protection engine 2003. As shown in FIG. 2, the client 2001 comprises a core functionality (e.g., one or more of a Central Processing Unit (CPU), dedicated circuitry and or a software module) 20011, an optional memory (and/or database) 20312, a transmitter 20013 and a receiver 20014. Moreover, the client 2001 comprises a retriever 20015, a performer 20016, an optional provider 20017 and an optional applicator 20018.

Moreover, the server 2002 comprises a core functionality (e.g., one or more of a Central Processing Unit (CPU), dedicated circuitry and/or a software module) 20021, an optional memory (and/or database) 20322, a transmitter 20023 and a receiver 20024. Moreover, the server 2002 comprises a transformer 20025, an optional combiner 20026 and an optional generator 20027.

In a similar manner, the optional protection engine 2003 comprises a core functionality (e.g., one or more of a Central Processing Unit (CPU), dedicated circuitry anchor a software module) 20031, an of memory (and/or database) 20032, an optional transmitter 20033 and an optional receiver 20034. Moreover, the protection engine 2003 comprises an optional reader 20035, an optional searcher 20036 and an optional obfuscator 20037.

In the following paragraphs, x=1, 2 or 3 (the client 2001, the server 2002 or the protection engine 2003). As partly indicated by the dashed extensions of the functional blocks of the CPUs $200x1$, the retriever 20015, the performed 20016, the provider 20017 and the applicator 20018 (of the client 2001), the transformer 20025, the combiner 20026 and the generator atom 20027 (of the server 2002) and the reader 20035, the searcher 20036 and the obfuscator 20037 (of the protection engine 2003) as well as the memory $200x1$, the transmitter $200x3$ and the receiver $200x4$ may at least partially be functionalities running on the CPUs $200x2$, or may alternatively be separate functional entities or means controlled by the CPUs $200x1$ and supplying the same with information. The transmitter and receiver components $200x3$, $200x4$ may be realized to comprise suitable (software and/or hardware) interfaces and/or suitable signal generation and evaluation functions.

The CPUs $200x1$ may be configured, for example, using software residing in the memories $200x2$, to process various data inputs and to control the functions of the memories $200x2$, the transmitter $200x3$ and the receiver $200x3$ (as well as of the retriever 20015, the performed 20016, the provider 20017 and the applicator 20018 (of the client 2001), the transformer 20025 the combiner 20026 and the generator 20027 (of the server 2002) and the reader 20035, the searcher 20036 and the obfuscator 20037 (of the protection engine 2003)). The memory $200x2$ may serve for storing program code for carrying out the methods according to the aspects disclosed herein, when executed by the CPU $200x1$.

It is to be noted that the transmitter $200x3$ and the receiver $200x4$ may be provided as an integral transceiver, as is indicated in FIG. 2. It is further to be noted that the transmitters/receivers $200x3$, $200x4$ may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the retrieves 20015, the performed 2001 the provider 20017 and the applicator 20018 (of the client 2001), the transformer 20025, the combiner 20026 and the generator 20027 (of the server 2002) and the reader 20035, the searcher 20036 and the obfuscuator 20037 (of me protection engine 2003), or the respective functionalities, may also be implemented as a chipset, module or subassembly.

FIG. 2 shows a first method embodiment and also reflects the interaction between the components of the system embodiment of FIG. 1. In the signalling diagram of FIG. 2, time aspects between signalling are reflected in the vertical arrangement of the signalling sequence as well as in the sequence numbers. It is to be noted that the time aspects indicated in FIG. 2 do not necessarily restrict any one of the method steps shown to the step sequence outlined in FIG. 2. This applies in particular to method steps that are functionally disjunctive with each other. For instance, steps S1-0a and S1-0b belonging to the protection process are shown immediately before the remaining steps performed during runtime; however, this does not rule out that the protection process has been performed considerably ahead of the runtime processes.

The method embodiment of FIG. 2 illustrated an activation process for an executable file on a particular client machine denoted by 2001. As an optional preparatory measure, in step S1-0 (client side) and step S2-0 (server side), the client 2001 and the server 2002 perform authenticating the client 2001 at the server 2002 using login information and credentials (e.g., a user name and a password).

At the beginning, in step S1-1, for example when the executable file is started, the retriever 20015 of the client 2001 retrieves hardware information of the client (e.g., by querying individual hardware components thereof or by reading it from a registry file). The hardware information is at least substantially unique, which means that there is a low probability of another client machine exhibiting the same hardware information. The retrieved hardware information may be optionally hashed to generate a hash value derived from the hardware information (step 1-1a) before it is added to a so-called requestToken. The nominal constants in the executable file to be protected were already previously extracted from the executable file (see FIG. 2B, step prep-1a) and may have been transformed during the protection process.

The client 2001 will then connect to the server 2002 and send, via the transmitter 20013 of the client 2001, the requestToken to server 2002. The requestToken contains i) the (hashed) hardware information of the current machine (client 2001), ii) optionally the nominal constants (as extracted from the executable file or otherwise determined and optionally as encrypted data) and iii), further optionally, a hash value of the executable file which was protected (by obfuscating the nominal constants).

In step S2-1, the receiver 20024 of the server 2002 receives the requestToken. Then, on the server 2003, a responseToken may be calculated as will now be described in more detail.

The responseToken generally contains the transformed constants. That is, in step S2-2, the transformer 20025 of the server 2002 transforms the nominal constant using the hardware information (or the corresponding hash value).

As an option, in step S2-2a, the (random number) generator 20027 of the server 2002 is initialized with the same seed as during the protection process (e.g., using the hash value of the executable file or another seed) and therefore, the random number is deterministic (i.e., always yields the same numbers in the same order). Then, in an optional step S2-2b, the combiner 20026 of the server 2002 randomly combines the nominal constants with the (hashed) hardware information of the requestToken. For the transformation of constants, arithmetic and logical operations can be used (such as summing, subtraction, exclusive OR (XOR).

In step S2-3, the transmitter 20023 of the server 2002 sends the responseToken back to the client 2002, whereupon, in step S1-3, the responseToken is received by the receiver 20014 of the client 2001.

In an optional step S1-4, the client 2001 may load the responseToken into memory. Then, in step S1-5, the performer 20016 of the client 2001 performs an inverse transformation on the received constants using the hardware information (or the value derived therefrom, e.g., the hash value), and the inversely transformed constants may be used to recalculate the original constants at runtime so as to allow nominal flow the executable file.

That is, the performer 20016 uses the received transformed constants and the retrieved hardware information to calculate the inverse transformation of the constants before they are used in the executable file lacking the nominal constant(s). If the hardware information of the client 2001 currently used is different to the client 2001 used during activation, the inverse transformation will cause wrong results and therefore the software logic of the executable file will cause undefined behavior.

In one variant, only so-called "secure constants" are used for the protection (e.g., during the protection process and/or during runtime). Those "secure constants" are constants (e.g., floating point numbers), which are not used for pointer arithmetic. Such floating point numbers are usually used in physics computation and rendering and may lead to unexpected computations and wrong displaying of graphics. However, those secure constants are preferred, because they do not cause the software to crash or at least cause a crash at a later point of the execution flow.

FIG. 2A shows a first optional method embodiment to be used with the embodiment shown in FIG. 2.

As an overview, the above described activation process is usually done once and may then be cached into a local license file so that the executable file can also be used when the client 2001 is offline or otherwise has no connection to the server 2002. As example, the transformed constant(s) may be logged in the license information so as to allow a valid inverse transformation. As such, the nominal constants can be recovered during runtime even when the client 2001 has no contact to the server 2002.

Accordingly, if no license exists (step alt-0), a new first type of license (step alt-1a) has only to be built when the hardware information has changed since the activation process. If the hardware information matches the license (step alt-1b), only the step of performing S1-5 the inverse transformation (and the optional step S1-4) may be performed based on transformed constants from the license (file).

In more detail, the proposed approach can be combined with any DRM approach. For instance, the proposed approach may be combined with an online platform for games (or other executable files) where end-users can purchase games (or other executable files). The server 2002 component may run as part of the platform servers. When a client 2001 requests an activation as described above from the platform servers, only when this end-user has purchased the game (or other executable file) (i.e., the user has the rights and, thus, is authorized), will the server 2003 return a second type of license (such as a DRM license). Usage of DRM may considerably augment to the proposed approach, since the scope of users attaining a valid license from the server 2002 is limited to genuine purchasers of the executable file.

FIG. 2B shows a second optional method embodiment to be used with the embodiment shown in FIG. 2. That is, as a preparatory measure, the client 2001 may be provided with the executable file containing the obfuscated code for recovering the nominal constants, while the server 2002 may be provided with the nominal constants.

In more detail, in step prep-1$a$, the reader 20035 of the of the protection engine 2003 parses the executable file, so that in step prep-1$b$, the searcher 20036 of the protection engine 2003 searches constants referenced by code inside the executable file. The executable file may be received by the reader 20035 in an executable format (e.g., the Windows™ Portable Executable format).

Then, in step prep-1$c$, the obfuscator 20037 of the protection engine 2003 replaces the instructions that use these constants with an algorithm that processes the hardware information of the current machine, such as with a pseudo-random number generator (PRNG) generating static keys and hardware bound license information (step prep-1$d$). This algorithm re-calculates the nominal constant from the hardware information during runtime of the application.

Finally, in step prep-1$e$, the transmitter 20013 of the protection engine 2003 transmits all protected constants in their nominal form to the server 2002. In this way, the server 2002 obtains a priori knowledge of all protected nominal constants. In an alternative implementation, the client 2001 retrieves the protected (i.e., encrypted) constants from the executable file or any other data source and transmits same to the server 2007 together with the (optionally hashed) hardware information. Of course, the two approaches could also be combined as needed.

Figure 3:
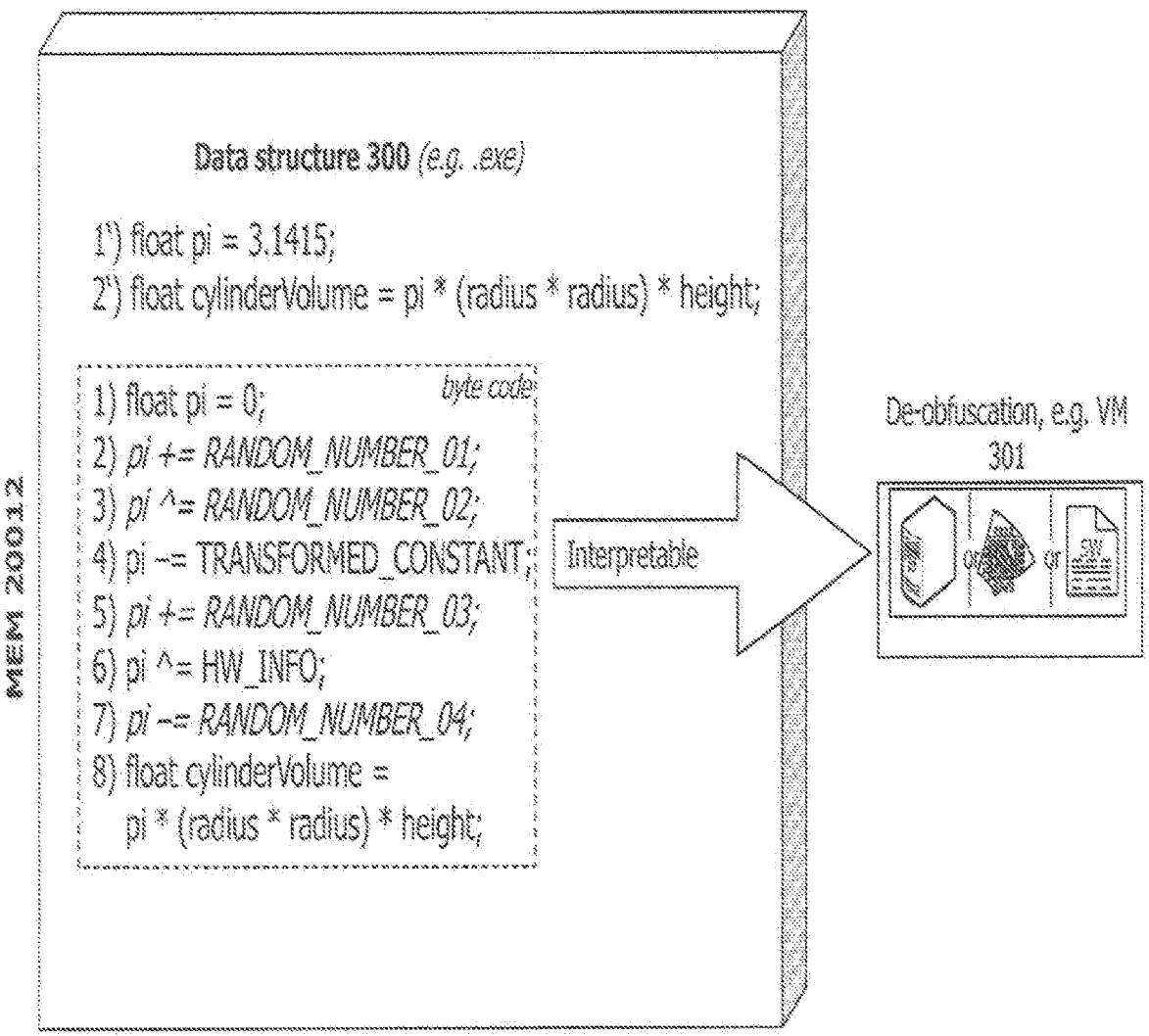
FIG. 3 shows an example data structure (e.g. executable file) for illustrating an exemplary use case.

FIG. 3 shows an example data structure (executable file) for illustrating an exemplary use case.

The upper part of FIG. 3 shows an example of unprotected executable code, (i.e., before the protection process). This is code as it might be found in an unprotected executable file, which is calculating the volume of a cylinder.

1') float pi=3.1415;
2') float cylinderVolume=pi*(radius*radius)*height;

The lower part of FIG. 3 shows an example of protected executable code. Functionally, the code below is the same code as above, which code below would appear in the protected executable file after the protection process, except that the constant PI is calculated at runtime depending on the hardware information or the currently used machine.

1) float pi=0;
2) pi+=RANDOM_NUMBER_01;
3) pi^=RANDOM_NUMBER_02;
4) pi-=TRANSFORMED_CONSTANT;
5) pi+=RANDOM_NUMBER_03;
6) pi^=HW_INFO;
7) pi-=RANDOM_NUMBER_04;
8) float cylinderVolume=pi*(radius*radius)*height;

It is to be noted that the above code example would also work when relying on steps 1, 4, 6 and 8 alone, which would already allow for transformation/inverse transformation of the constants. However, when additionally applying steps 2, 3, 5 and 7, an additional random element is introduced, which only works when e.g. the hash value of the executable file is used as a seed for the above-discussed PRNG.

Still further, the above use case example was directed to the constant Pi. However, this does of course not exclude the use or other constants, such as g=9.81 (m/s$^2$) for calculation of free fall acceleration or G=6.67384·10−11 (m$^3$/(kg·s$^2$)) for calculation of gravitational force between two masses.

Accordingly, the above code shows how hardware binding would be attained with the proposed approach. Thus, the approach no longer involves a comparison, and if the hardware information of the currently used machine (client) is different than the one used for activation (as, e.g., stored in a license file or something similar), then the constant would be different than it was in its nominal form, which prevents a nominal flow of the executable file.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for enabling nominal flow of an executable file on a client comprising:
  reading at least a portion of the executable file on the client, wherein the executable file comprises a code portion lacking a data portion enabling the nominal flow of the executable file;
  retrieving substantially unique information derived from hardware of the client;
  transmitting the substantially unique information to a server;
  receiving at least one transformed data portion that has been transformed based on the substantially unique information;
  performing, using the substantially unique information, an inverse transformation on the at least one transformed data portion to recover the data portion; and
  executing the executable file in accordance with the data portion.

2. The method of claim 1, further comprising:
  receiving, by the client, the executable file in which at least one code portion for the inverse transformation has been inserted.

3. The method of claim 1, further comprising:
  wherein the substantially unique information is a hash value created from information relating to the hardware of the client.

4. The method of claim 1, wherein one or more of the at least one transformed data portion and the substantially unique information are expressed as a numerical value, and wherein the inverse transformation comprises at least one of:
  a reversible arithmetic operation on the transformed data portion and the substantially unique information; and
  one or more reversible logical operations on the transformed data portion and the substantially unique information.

5. The method of claim 1, further comprising:
  building, a license file from the at least one transformed data portion.

6. The method of claim 1, wherein the data portion includes a nominal constant.

7. The method of claim 6, wherein the data portion is at least one of:
  an integer number constant;
  executable code; and
  a floating-point number constant.

8. The method of claim 1, wherein the substantially unique information includes one or more of the following elements:
  a Media Access Control, MAC, address of the client;
  an ID of one or more constituent hardware components of the client;
  an International Mobile Subscriber Identity, IMSI, of the client; and an International Mobile Station Equipment Identity, IMEI, of the client.

9. A system for enabling nominal flow of an executable file on a client comprising:
at least one processor; and
at least one memory storing instructions which, when executed by the processor, cause the processor to:
read at least a portion of the executable file on the client, wherein the executable file comprises a code portion lacking a data portion enabling the nominal flow of the executable file;
retrieve substantially unique information derived from hardware of the client;
transmit the substantially unique information to a server;
receive at least one transformed data portion that has been transformed based on the substantially unique information;
perform, using the substantially unique information, an inverse transformation on the at least one transformed data portion to recover the data portion; and
executing the executable file in accordance with the data portion.

10. The system of claim 9, further, wherein the instructions further cause the processor to:
receive, by the client, the executable file in which at least one code portion for the inverse transformation has been inserted.

11. The system of claim 9, wherein the substantially unique information is a hash value created from information relating to the hardware of the client.

12. The system of claim 9, wherein one or more of the at least one transformed data portion and the substantially unique information are expressed as a numerical value, and wherein the inverse transformation comprises at least one of:
a reversible arithmetic operation on the transformed data portion and the substantially unique information; and
one or more reversible logical operations on the transformed data portion and the substantially unique information.

13. The system of claim 9, further comprising:
building, a license file from the at least one transformed data portion.

14. The system of claim 9, wherein the data portion includes a nominal constant.

15. The system of claim 9, wherein the data portion is at least one of:
an integer number constant;
executable code; and
a floating-point number constant.

16. The system of claim 9, wherein the substantially unique information includes one or more of the following elements:
a Media Access Control, MAC, address of the client;
an ID of one or more constituent hardware components of the client;
an International Mobile Subscriber Identity, IMSI, of the client; and
an International Mobile Station Equipment Identity, IMEI, of the client.

17. A method for enabling nominal flow of an executable file on a client comprising:
reading at least a portion of the executable file on the client, wherein the executable file comprises a code portion lacking a data portion enabling the nominal flow of the executable file;
receiving substantially unique information derived from hardware of a client device; and
sending at least one transformed data portion that has been transformed based on the substantially unique information;
whereby the client device can read at least a portion of an executable including a code portion lacking a data portion enabling the nominal flow of the executable file and perform, using the substantially unique information, an inverse transformation on the at least one transformed data portion to recover the data portion; and execute the executable file in accordance with the data portion.

* * * * *